Nov. 5, 1963       H. V. KRAUTWURST       3,109,320
BRAKE LEVER
Filed April 12, 1961       2 Sheets-Sheet 1
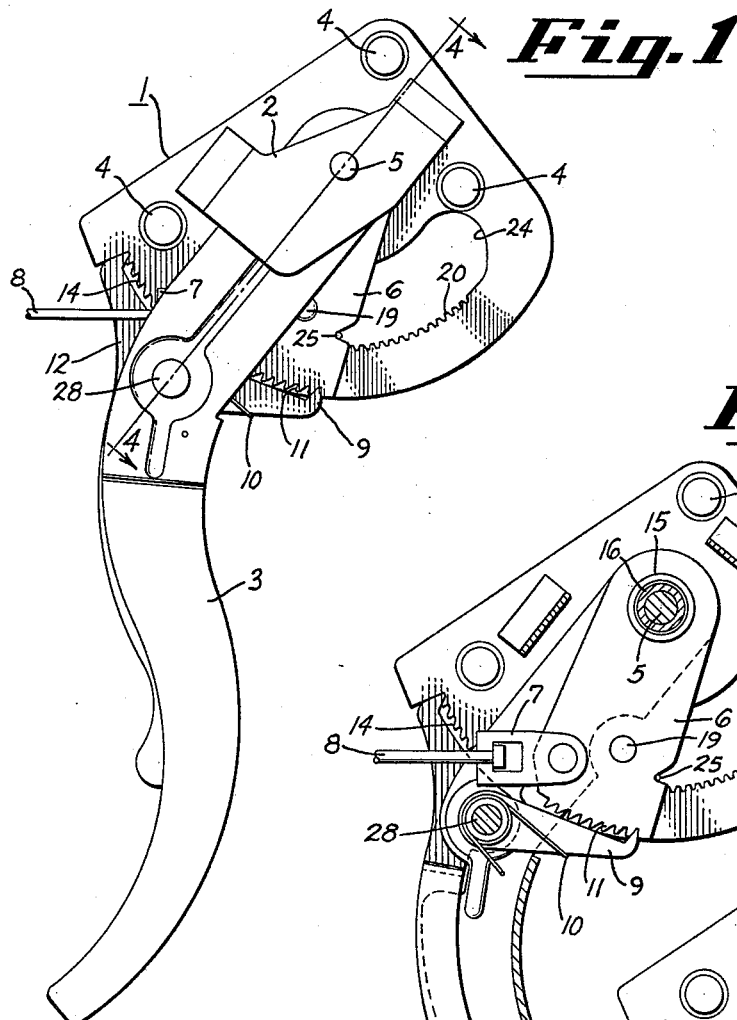
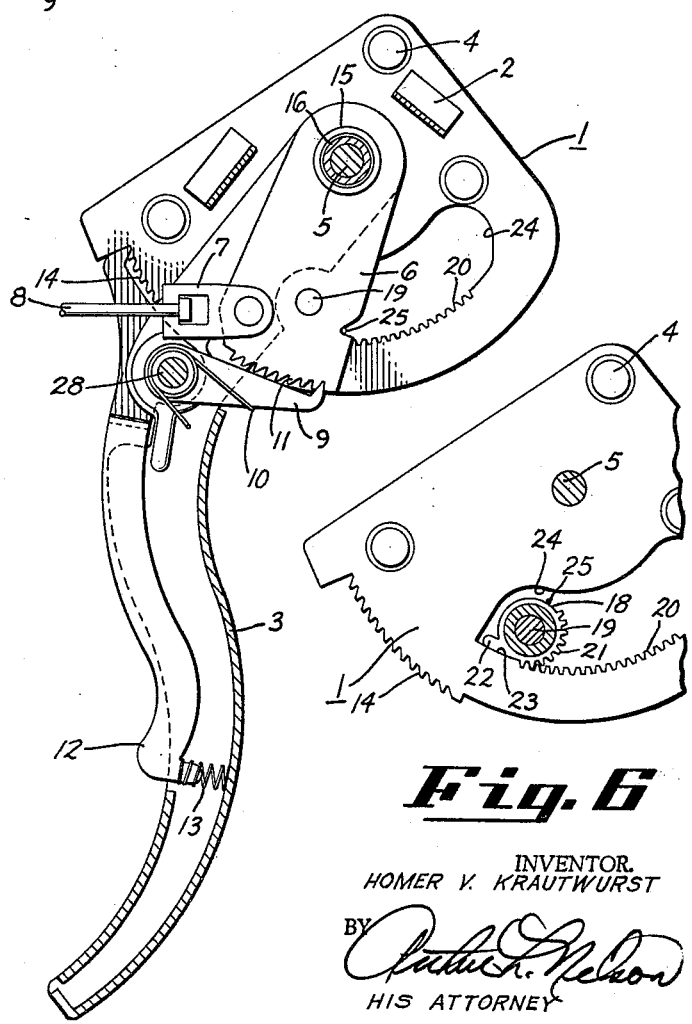
INVENTOR.
HOMER V. KRAUTWURST
BY
HIS ATTORNEY

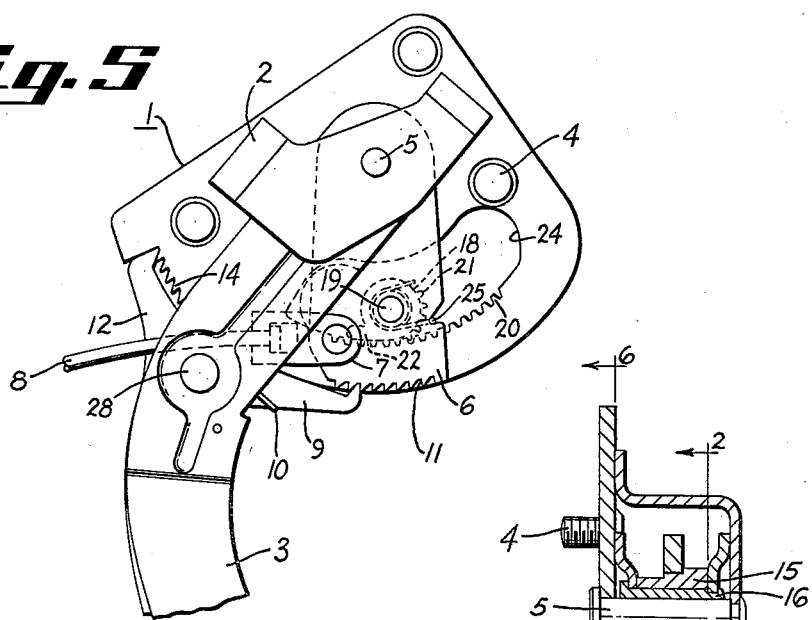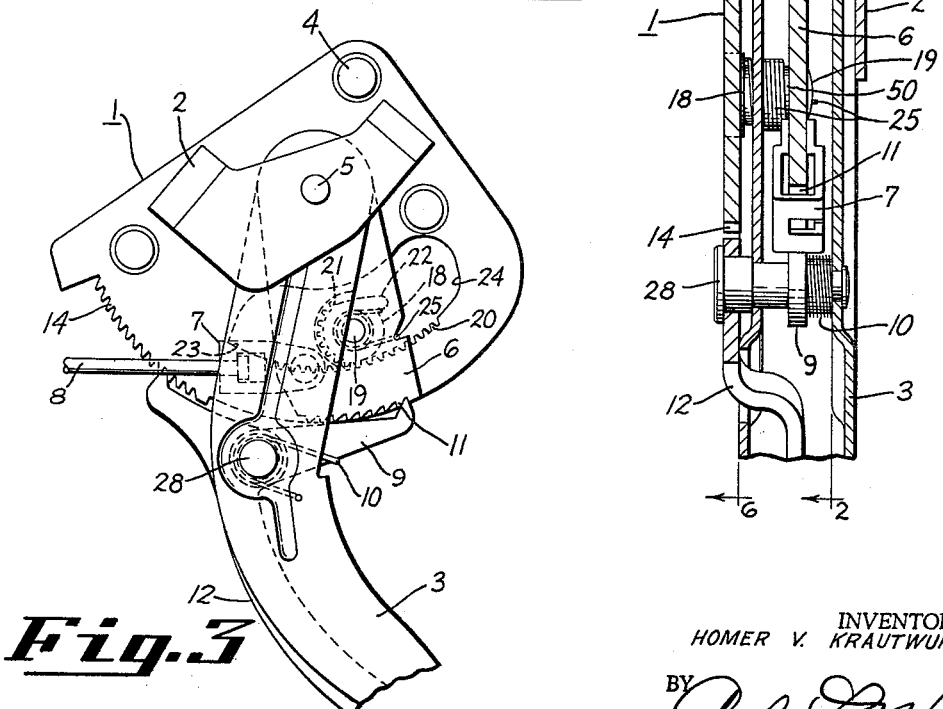

United States Patent Office 3,109,320
Patented Nov. 5, 1963

3,109,320
BRAKE LEVER
Homer V. Krautwurst, Rochester, N.Y., assignor to General Motors Corporation, Detroit, Mich., a corporation of Delaware
Filed Apr. 12, 1961, Ser. No. 102,452
8 Claims. (Cl. 74—529)

This invention relates to a brake lever and more particularly to a slack take-up device on a parking brake lever.

The conventional parking brake on a motor vehicle mechanically operates the rear wheel brakes when a motor vehicle is parked. As the friction material on the brake shoes wear, a clearance develops between the friction material and the brake drum. Accordingly in actuating the parking brake greater movement of the brake lever is required to overcome this clearance in engaging the brake shoes with the brake drum. This invention is intended to manually adjust for the clearance between the brake shoes and the brake drum through a device mounted on the brake lever. By providing an automatic take-up of this type the brake lever swings through an arc of the said number of degrees regardless of wear on the brake shoes.

It is an object of this invention to provide automatic cable take-up for a vehicle parking brake.

It is another object of this invention to include a compensating sector and means for rotating and locking the sector relative to the parking brake lever in providing automatic cable take-up.

The objects of this invention are accomplished through a compensating device in combination with a brake lever, and a means for rotatably mounting the brake lever. A compensating sector pivots about the same pivot point as the brake lever and carries a cable clevis. The compensating sector also carries a gear segment operating in a gear track on the mounting means. By rotating a brake lever the compensating sector is allowed to rotate relative to the brake lever on the return stroke and thereby take up excessive slack in the brake cable. In the new retracted position the compensating sector is in a rotated position relative to the brake lever and in this manner takes up slack in the braking cable.

Further objects and advantages of the present invention will be apparent from the following description, reference being had to the accompanying drawings wherein a preferred embodiment of the present invention is clearly shown.

In the drawings:

FIGURE 1 is a side elevation view of the parking brake lever.

FIGURE 2 is a cross-section view taken on line 2—2 of FIGURE 4.

FIGURE 3 illustrates the operating position of the brake lever with the gear segment rotating in the gear track.

FIGURE 4 is a crosss-section view taken on line 4—4 of FIGURE 1.

FIGURE 5 is a retracted piston for the break lever with the compensating sector rotated relative to the brake lever.

FIGURE 6 is a cross-section view taken on line 6—6 of FIGURE 4.

Referring to FIGURE 1 the brake lever is shown in a side elevation view. The mounting plate 1 is mounted on the dashboard of the motor vehicle by means of the plurality of rivets 4. The bracket 2 is welded integral with the mounting plate 1 to provide a bearing support for the brake lever 3. The pin 5 extends through the mounting plate 1 and the bracket 2 and is riveted to provide a pivoting means for the brake lever 3. A compensating sector 6 is pivotally mounted on the pin 5 and rotates about the common pivoting axis of the lever 3. The compensating sector 6 supports a cable clevis 7 which in turn is connected to the brake cable 8.

The brake lever 3 is formed of a U-shaped stamping which carries the rivet 28 which provides a pivoting support for the pawl 9. The pawl 9 is biased to an engaging position with the ratchet 11 by the pawl spring 10.

Referring to FIGURE 2, the pawl 9 and the pawl spring 10 are more clearly shown. The pawl spring engages the back side of the pawl and also extends through an opening in the brake lever 3. The spring is a torsion spring biasing the pawl 9 to rotate in engagement of the ratchet 11.

The latch 12 is also pivotally supported on the rivet 28. The latch 12 is biased by the compression spring 13 to an engaging position with the ratchet 14 on the mounting plate 1. The compensating sector 6 is mounted on the sleeve 15 which receives the bushing 16. The bushing 16 is rotatably mounted on the pin 5. The bushing 16 is fastened to the brake lever 3 to provide means for rotating the brake lever 3 about the pin 5.

FIGURE 4 illustrates the relationship of the bushing 16 and the sleeve 15 mounted on the pin 5. The mounting plate 1 and the bracket 2 provide a supporting means for the pin 5.

The compensating sector 6 supports a gear segment 18 by means of the rivet 19. The rivet 19 extends through the compensating sector 6, a spacer 50, and retains the gear segment 18. The gear segment 18 is rotatably mounted on the rivet 19 and its axis swings on an arc about the axis of the pin 5 as the sector 6 is rotated. The gear segment 18 also rotates about the rivet 19 as the teeth 21 of the gear segment mesh with the gear track 20 in the mounting plate 1 while the sector 6 is rotated. The gear track 20 is formed on an arcuate surface having its arc center on the pivot axis of lever 3 and sector 6.

FIGURE 6 illustrates the gear segment 18 and the plurality of teeth 21 forming a portion on its outer periphery. The lug 22 is also formed on the outer periphery of the gear segment 18. The arcuate portion 23 of the lug 22 is shown contacting a mating portion on an arc of the slot 24 formed on the mounting plate 1.

FIGURE 6 illustrates the position of the gear segment in its retracted position where no adjusting is made for slack take-up of the cable.

FIGURE 4 illustrates a cross-section view of the pivoting support for the brake lever 3 and the compensating sector 6. The pivoting support for the pawl 9 and the latch 12 is also illustrated in FIGURE 4.

FIGURE 3 illustrates the gear segment rotated to an adjusting position as the lever 3 is rotated about its axis. The gear segment 18 is rotated by the gear track 20 against the biasing force of the spring 25. The compensating sector 6 is rotated about its axis through engagement of the pawl 9 carried on lever 3 which engages the ratchet 11. The latch 12 also engages the ratchet 14 and maintains the lever 3 in its rotated position.

If excessive slack exists on the brake cable the lever 3 will continue to rotate beyond the point at which the teeth in the gear segment 18 no longer mesh with the gear track 20. Gear segment 18 then slides over the track 20. Under these conditions upon return rotation of the lever 3 the gear segment teeth 21 will mesh with track 20 under influence of spring 25 and the segment 18 will counter rotate until it returns to a retracted position similar to the illustrated position in FIGURE 5. In FIGURE 5 the gear track 20 engages the arcuate portion 23 of the gear segment 18 maintaining a retracted position wherein the compensating sector 6 is rotated counterclockwise relative to the lever 3. In this manner excessive slack is taken up by the rotational movement of the compensating sector 6 relative to the lever 3.

The operation of the device will be described in the following paragraphs. As the lever 3 is rotated in the counterclockwise direction the pawl 9 rotates the compensating sectors 6 through engagement with the ratchet 11. The latch 12 is biased to an engaging position with the ratchet 14 by the compression spring 13. The latch 12 however, slides over the back side of the ratchet teeth 14. As the lever 3 and the compensating sector 6 are rotated in a counterclockwise direction the cable 8 is tightened. The compensating sector 6 carries the cable clevis 7 which tightens the cable 8, and also carries the gear segment 18. The gear segment 18 pivots with the compensating sector 6 in the arcuate slot 24 as well as rotating about its own axis due to the engagement of the teeth 21 with the gear track 20. The gear segment 18 continues to rotate so long as there are sufficient gear teeth 21 meshing the gear track 20. As the vehicle brakes are actuated the lever is maintained in this position by the engagement of the latch 12 of the ratchet 14.

If however, the condition is reached whereby the gear segment 18 no longer has teeth 21 engaging the gear track 20 in the mounting plate 1, the gear segment 18 no longer rotates about its own axis but slides over the ends of the teeth of gear track 20. The gear segment 18 merely continues to pivot with a translatory movement about the common pivot point of the compensating sector 6 which is the axis of pin 5. The brake lever 3 continues to pivot about the same axis as the compensating sector 6 until the slack in cable 8 is completely removed and the vehicle brakes are actuated. In this position the latch 12 has continued to slide over the back side of the teeth of the ratchet 14. The latch 12 maintains the locked position for the brake lever 3 when the parking brake is in the actuated position.

The vehicle brakes are released by pivoting the latch 12 against the force of spring 13 about the pin 28 carried on lever 3. With the release of the latch 12 from the ratchet 14, the lever 3 is permitted to rotate clockwise. The movement of the brake cable 8 permits the brake shoe to contract from the brake drum and disengage the vehicle brakes. With the disengagement of the vehicle brakes the compensating sector 6 rotates clockwise about the pin 5 with the brake lever 3. The gear segment spring 25 rotates the gear teeth 21 into engagement with the gear track 20 and the gear segment 18 rotates about the rivet 19. With the return rotation of the compensating sector 6, the gear segment 18 continues to rotate until the arcuate portion 23 of the gear segment engages the gear track 20. In this position the gear segment 18 no longer rotates and therefore the compensating section 6 no longer pivots with the brake lever 3. The compensating sector 6 has reached its new retracted position relative to the mounting plate 1. The gear segment 18 has counter rotated through an arc equal to the arc of its forward rotation. The brake lever 3 however is permitted to continue to counter rotate as the pawl 9 slides over the back side of the teeth of the ratchet 11. As the brake lever 3 returns to its original retracted position the pawl 9 engages a different tooth than is originally engaged prior to brake actuation.

In the return position the brake cable slack has been taken up due to the rotation of the compensating sector relative to the brake lever 3. The compensating sector 6 maintains this relative position with the brake lever 3 until wear is incurred on the brake shoes and the compensating sector further rotates relative to brake lever 3 during the braking cycle as described above.

It can be seen that the slack in the brake cable is automatically taken up during brake actuation. The brake lever 3 swings through an arc of the same magnitude forwardly and rearwardly. The compensating sector 6 also swings through an arc of the same number of degrees as the brake lever in forward rotation during brake actuation. The only difference being that the compensating sector rotates relative to the brake lever 3 in return rotation to tighten the cable and thereby compensates for wear of the brakes.

While the embodiment of the present invention as herein disclosed, constitute a preferred form, it is to be understood that other forms might be adopted.

What is claimed is as follows:

1. A parking brake lever comprising in combination, a mounting means, a lever pivotally supported on said mounting means, a compensating sector pivotally mounted on said mounting means and having a brake actuating member attached thereto, a ratchet means on said mounting means, a ratchet means on said compensating sector, a gear segment rotatably carried on said compensating sector engaging said mounting means for providing limited rotation of said gear segment upon rotation of said compensating sector, a pawl member carried on said lever, a latch member carried on said lever engaging said ratchet means on said mounting means, said pawl member engaging said ratchet means on said compensating sector, said lever and said compensating sector rotating about a common axis to provide brake actuation and counter-rotating upon release of said brake lever through arcs of different magnitude upon retraction of said brake lever thereby providing a means for taking up excessive cable slack for said parking brake lever.

2. A parking brake lever comprising in combination, a support member, a brake lever pivotally mounted on said support member, a compensating sector pivotally mounted on said support member, a cable attaching means connected to said compensating sector, a gear track formed in a slot on said support member, a gear segment rotatably mounted on said compensating sector and having a tooth portion initially engaging said gear track and an arcuate portion slidable over said gear track when said gear portion has rotated out of meshing engagement with said gear track, a ratchet means on said compensating sector, pawl means carried on said brake lever engaging said ratchet means on said compensating sector, ratchet means on said support member, latch means on said lever engaging said ratchet means on said support member to provide a locking means for said brake lever relative to said support member, said gear segment rotating relative to said compensating sector upon meshing with said gear track during initial movement of said brake lever and said compensating sector pivoting as a unit during forward lever movement and sliding over said gear track during subsequent forward lever movement and having return rotation upon again meshing with said gear track to rotate said compensating sector relative to said brake lever when excessive cable slack exists prior to brake actuation.

3. A parking brake lever comprising in combination, a mounting member, a brake lever pivotally mounted on said mounting member, a compensating sector pivotally mounted on said mounting member with a common axis of rotation with said brake lever, brake actuating cable attaching means connected to said compensating sector, a gear segment rotatably supported on said compensating sector and having a tooth portion and an arcuate portion having no teeth, an arcuate slot including a gear track engaging said tooth portion of said gear segment, first ratchet means on said compensating sector and second ratchet means on said mounting member, first pawl means carried on said brake lever engaging said first ratchet means and second pawl means carried on said brake lever and engaging said second ratchet means to control the relative position between said lever and said compensating sector and said mounting member, said gear segment rotating in said slot through a limited arc of rotation of said gear segment determined by the arc of said tooth portion thereof during initial movement of said lever and thereafter slidable in said slot with said arcuate portion having no teeth sliding over said gear track, said gear segment counter rotating to a new retracted position relative to said gear track thereby rotating said compensating sector relative to brake lever upon retraction of said brake lever to provide a cable take-up.

4. A parking brake lever comprising in combination, a mounting plate, a lever pivotally supported on said mounting plate, a compensating member pivotally supported on said plate about an axis common with the pivoting axis of said lever, first ratchet means on said compensating member, second ratchet means on said mounting plate, a pawl member carried on said lever and engaging said first ratchet means to provide means for rotating said compensating member by said lever, a latch member carried on said lever engaging said second ratchet means to provide a locking for said brake lever in the actuated position, a gear segment rotatably supported on said compensating member including, a tooth portion on said gear segment limiting the rotation of said gear segment relative said compensating member, a gear track formed on said mounting plate, a smooth portion of said gear segment to permit overriding of said gear segment with the gear track on said mounting plate, a stop on said gear segment limiting the counter rotation of said gear segment and limiting the pivoting arc of said compensating member during counter rotation of said compensating member upon releasing of said brake lever.

5. A parking lever comprising in combination, a mounting plate, a lever pivotally supported on said mounting plate, a compensating member pivotally supported on said mounting plate and pivoting about a common axis with said lever, first ratchet means on said compensating member, pawl means pivotally supported on said lever and said spring biased to an engaging position with said first ratchet means, second ratchet means on said mounting plate, a latch member pivotally supported on said lever and spring biased to an engaging position with said second ratchet means, an arcuate slot formed in said mounting plate having an arc center common with the axis of said compensating member, a gear track formed on the outer surface of said slot, a gear segment rotatably mounted on said compensating member, an engaging portion in said gear segment engaging with the gear track thereby limiting the rotational movement of said gear segment relative to said compensating member, a smooth portion on said gear segment permitting said gear segment to override said gear track, a return stop limiting the counter rotation of said gear segment and thereby limiting the arc of counter rotation to a predetermined maximum of said compensating member when said brake lever is released.

6. A parking brake lever comprising in combination, a mounting plate, a lever pivotally supported on said mounting plate, a compensating member pivotally mounted on said mounting plate about a common axis with said lever, a ratchet means on said compensating member, a spring biased pawl pivotally supported on said lever and biased to an engaging position with said ratchet means on said compensating member, a ratchet portion on said mounting plate, a spring biased latch on said lever biased to said engaging position with said ratchet portion on said mounting plate, a rotatable control means rotatably mounted on said compensating member to permit relative rotation of said compensating member through an arc in one direction equal to the rotational movement of said lever, said rotational control means limiting the counter rotation of said compensating member to a predetermined maximum arc in the other direction regardless of the arc of counter rotation of said brake lever as said lever is released.

7. A parking brake lever comprising in combination, a mounting member, a lever pivotally supported on said mounting member, a compensating member pivotally supported on said mounting member about an axis common with the axis of rotation of said lever, first ratchet means on said compensating member, a spring biased pawl on said lever biased to an engaging position with said first ratchet means, second ratchet means on said mounting member, a spring biased latch pivotally supported on said lever biased to an engaging position with said second ratchet means to provide a locking position for said braking lever, a rotatable control means rotatably mounted on said compensating member permitting rotational movement of said compensating member with said lever, said rotatable control means limiting the magnitude of the arc of counter rotation of said compensating member regardless of the magnitude of the arc of counter rotation of said brake lever when said brake lever is released.

8. A parking brake lever comprising in combination, a mounting member, a lever pivotally supported on said mounting member, a compensating member pivoted on said mounting member about an axis common with said lever, means on said compensating member adapted for connection with a brake cable, a spring biased pawl pivotally supported on said lever biased to an engaging position with said compensating member to rotate said compensating member with said lever during brake actuation, a ratchet means on said mounting member, a spring biased latch pivotally supported on said lever biased to an engaging position with said ratchet means to provide a locking position of said brake lever when said brake lever is actuated, a rotatable control means rotatably mounted on said compensating member, engaging means on said mounting member for engaging said rotational control means, means on said rotatable control means limiting the rotational and counter rotational movement of said rotatable control means to an arc of equal magnitude, the counter rotation movement of said rotatable control means permitting said lever to counter rotate through an arc of greater magnitude than the arc of said compensating member to provide cable take-up when said brake lever is released.

References Cited in the file of this patent

UNITED STATES PATENTS 2,507,997   Roedding et al. _____ May 16, 1950